United States Patent
Choudhury et al.

(10) Patent No.: US 9,021,477 B2
(45) Date of Patent: *Apr. 28, 2015

(54) METHOD FOR IMPROVING THE PERFORMANCE OF HIGH PERFORMANCE COMPUTING APPLICATIONS ON CLOUD USING INTEGRATED LOAD BALANCING

(75) Inventors: Anamitra R. Choudhury, Vasant Kunj (IN); Thomas George, Gurgaon (IN); Monu Kedia, Vasant Kunj (IN); Yogish Sabharwal, Gurgaon (IN); Vaibhav Saxena, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/596,345

(22) Filed: Aug. 28, 2012

(65) Prior Publication Data
US 2013/0031550 A1    Jan. 31, 2013

Related U.S. Application Data

(63) Continuation of application No. 13/192,536, filed on Jul. 28, 2011.

(51) Int. Cl.
*G06F 9/455* (2006.01)
*G06F 9/46* (2006.01)
*G06F 15/173* (2006.01)
*G06F 9/50* (2006.01)
*G06F 9/48* (2006.01)

(52) U.S. Cl.
CPC .......... *G06F 9/5027* (2013.01); *G06F 9/45558* (2013.01); *G06F 2009/4557* (2013.01); *G06F 9/4843* (2013.01); *G06F 9/5033* (2013.01); *G06F 9/5072* (2013.01)

(58) Field of Classification Search
None
See application file for complete search history.

(56) References Cited

U.S. PATENT DOCUMENTS

| 8,095,929 B1* | 1/2012 | Ji et al. ............................. 718/1 |
| 8,396,807 B1* | 3/2013 | Yemini et al. .................. 705/59 |
| 2006/0150158 A1* | 7/2006 | Fellenstein et al. ........... 717/126 |
| 2007/0101336 A1* | 5/2007 | Moore et al. .................. 718/102 |

(Continued)

OTHER PUBLICATIONS

Karypis, et al., "A Fast and High Quality Multilevel Scheme for Partitioning Irregular Graphs," SIAM Journal on Scientific Computing, 20, 1998, pp. 1-28.

(Continued)

*Primary Examiner* — Charles Swift
(74) *Attorney, Agent, or Firm* — Gibb & Riley, LLC (57) ABSTRACT

A computer-implemented method of load balancing including calculating an expected cost set associated with an application-specific task of an application executing on a processing resource in a cloud computing environment, and communicating the expected cost set from the processing resource to a cloud management system. Resource mapping of applications currently executing in the cloud computing environment are retrieved, the application-specific task is assigned to a specific computational resource in the cloud computing environment based on the expected cost set and the resource mapping of applications currently executing in the cloud computing environment. A task to VM (virtual machine) assignment is determined based on the assignment of the application-specific task to the specific computational resource. The task to VM assignment is transferred from the cloud management system to the application executing on the processing resource in the cloud computing environment.

17 Claims, 9 Drawing Sheets

(56) References Cited

U.S. PATENT DOCUMENTS

| | | | | |
|---|---|---|---|---|
| 2009/0222560 | A1* | 9/2009 | Gopisetty et al. | 709/226 |
| 2009/0235268 | A1* | 9/2009 | Seidman et al. | 718/104 |
| 2010/0088150 | A1 | 4/2010 | Mazhar et al. | |
| 2010/0153945 | A1* | 6/2010 | Bansal et al. | 718/1 |
| 2010/0223378 | A1* | 9/2010 | Wei | 709/224 |
| 2010/0306382 | A1* | 12/2010 | Cardosa et al. | 709/226 |
| 2010/0306773 | A1* | 12/2010 | Lee et al. | 718/1 |
| 2010/0318609 | A1 | 12/2010 | Lahiri et al. | |
| 2011/0067030 | A1* | 3/2011 | Isard et al. | 718/102 |
| 2011/0214122 | A1* | 9/2011 | Lublin et al. | 718/1 |
| 2012/0131591 | A1* | 5/2012 | Moorthi et al. | 718/104 |
| 2012/0266168 | A1* | 10/2012 | Spivak et al. | 718/1 |

OTHER PUBLICATIONS

Karypis, et al., "Multilevel k-way Partitioning Scheme for Irregular Graphs," Journal of Parallel and Distributed Computing, 48, Article No. PC971404, 1998, pp. 96-129.

Amazon Web Services, Elastic Load Balancing, Developer Guide, API Version April 5, 2001, 2011, pp. 1-52.

Riley, J., HPC In the Cloud StarCluster Brings HPC to the Amazon Cloud, Software Tools for Academics and Researchers Group MIT, May 18, 2010, pp. 1-4.

Lan, et al., Dynamic Load Balancing of SAMR Applications on Distributed Systems, ACM 1-58113-293X/01/0011, 2001, pp. 1-12.

Walker, E., benchmarking Amazon EC2 for high-performance scientific computing, Login, vol. 33, No. 5, Oct. 2008, pp. 18-23.

Adler, B., "Load Balancing in the Cloud: Tools, Tips, and Techniques A Technical White Paper," RightScale, www.rightscale.com, pp. 1-18.

Randles, et al, "A Comparative Study into Distributed Load Balancing Algorithms for Cloud Computing," IEEE 24th International Conference on Advanced Information Networking and Applications Workshops, 2010, pp. 551-556.

en.wikipedia.org/wiki/Cloud_computing#Technical_description.

U.S. Office Action Communication, U.S. Appl. No. 13/192,536 dated Apr. 17, 2014, pp. 1-21.

Appendix P: List of IBM Patents or Patent Applications Treated as Related, One Page, Jul. 9, 2014.

U.S. Office Action Communication, U.S. Appl. No. 13/192,536 dated Aug. 18, 2014, pp. 1-24.

* cited by examiner

METHOD FOR IMPROVING THE PERFORMANCE OF HIGH PERFORMANCE COMPUTING APPLICATIONS ON CLOUD USING INTEGRATED LOAD BALANCING

CROSS-REFERENCE TO RELATED APPLICATIONS

This application is a Continuation of U.S. application Ser. No. 13/192,536 filed Jul. 28, 2011, the complete disclosure of which, in its entirety, is herein incorporated by reference.

BACKGROUND

The embodiments presented herein generally relate to improving the performance of High Performance Computing (HPC) applications on the Cloud by integrating an application and cloud level load balancing.

Effective optimization of the load assignment on the Cloud needs to take into account the High Performance Computing (HPC) application task requirements as well as the computational capacity and communication bandwidth of the Cloud resources. This disclosure proposes an approach for two-way transfer of the essential information between Cloud and HPC applications that result in better load assignment without violating network privacy.

HPC applications are mostly scientific applications, (e.g. partial differential equation computations, computational fluid dynamics) which can be run on massively parallel architecture. An HPC application consists of a number of tasks, where each task performs some computation, and different tasks communicate. Normally, there are a greater number of tasks than the number of available compute nodes to perform such tasks. The tasks need to be mapped on to processors in the underlying parallel architecture such that processing on every processor is balanced, and communication between different processors is minimized.

HPC on dedicated clusters have known computational capacity and communication bandwidth for the individual resources. Applications can themselves optimize load assignment in an effective fashion in this case. However, the drawbacks of dedicated clusters have significant delays waiting for the cluster to be available for exclusive use, one cannot add or remove resources in case of an increased or decreased demand, and dedicated clusters have a fixed configuration that might not be optimal for applications with varying computation or communication patterns.

HPC on the Cloud (cloud computing) allows for dynamically changing heterogeneous computational capacity and communication bandwidth for the resources.

Cloud computing is a model for enabling convenient, on-demand network access to a shared pool of configurable computing resources (e.g., networks, servers, storage, applications, and services) that can be rapidly provisioned and released with minimal management effort or service provider interaction. ("NIST.gov—Computer Security Division—Computer Security Resource Center". Csrc.nist.gov.) Cloud computing provides computation, software, data access, and storage services that do not require end-user knowledge of the physical location and configuration of the system that delivers the services. Parallels to this concept can be drawn with the electricity grid, where end-users consume power without needing to understand the component devices or infra-structure required to provide the service. Cloud computing describes a new supplement, consumption, and delivery model for IT services based on Internet protocols, and it typically involves provisioning of dynamically scalable and often virtualized resources. It is a byproduct and consequence of the ease-of-access to remote computing sites provided by the Internet. This frequently takes the form of web-based tools or applications that users can access and use through a web browser as if they were programs installed locally on their own computers. (See <<en.wikipedia.org/wiki/Cloud_computing#Technical_description>>.)

Typical cloud computing providers deliver common business applications online that are accessed from another Web service or software like a Web browser, while the software and data are stored on servers. Most cloud computing infrastructures consist of services delivered through common centers and built-on servers. Clouds often appear as single points of access for consumers' computing needs.

Typically cloud load balancing is performed by monitoring current resource usage across the applications. The application performs load balancing on its own with available resources, over provisioning in cloud. Thus, load balancing is performed at two different levels independently, (the cloud and the application), and hence is sub-optimal.

SUMMARY

According to one embodiment presented herein, a first computing device located in an application executing environment calculates an expected cost set associated with an application-specific task of an application executing on a processing resource in a cloud computing environment, and communicates the expected cost set from the processing resource to the cloud computing environment. A second computing device located in a cloud management system, retrieves resource mapping of applications currently executing in the cloud computing environment, assigns the application-specific task to a specific computational resource in the cloud computing environment based on the expected cost set and the resource mapping of applications currently executing in the cloud computing environment, determines a task to VM (virtual machine) assignment based on the assigning the application-specific task to the specific computational resource, transfers the task to VM assignment from the cloud management system to the application executing on the processing resource in the cloud computing environment, and migrates VMs of existing applications onto different processing resources in the cloud computing environment based on assigning the application-specific task to the specific computational resource. The first computing device redistributes data and the application-specific task of the application based on transferring the task to VM assignment from the cloud management system to the application executing on the processing resource of the cloud computing environment.

According to another embodiment presented herein, a first computing device located in an application executing environment calculates an expected computational cost and an expected communication cost associated with an application-specific task of an application executing on a processing resource in a cloud computing environment, and communicates the expected computational cost and the expected communication cost from the processing resource to a cloud computing environment.

A second computing device located in a cloud management system retrieves resource mapping of applications currently executing in the cloud computing environment; assigning the application-specific task to a specific computational resource in the cloud computing environment based on the expected computational cost and the expected communication cost and the resource mapping of applications currently executing in the cloud computing environment; determines a task to VM (virtual machine) assignment based on the assigning of the application-specific task to the specific computational resource, transfers the task to VM assignment from the cloud management system to the application executing on the processing resource in the cloud computing environment, and migrates VMs of existing applications onto different processing resources in the cloud computing environment based on the assigning the application-specific task to the specific computational resource.

The first computing device then redistributes data and the application-specific task of the application based on transferring the task to VM assignment from the cloud management system to the application executing on the processing resource of the cloud computing environment.

According to another embodiment presented herein, a first computing device located in an application executing environment calculates an expected computational cost and an expected communication cost associated with an application-specific task of an application executing on a processing resource in a cloud computing environment, and communicates the expected computational cost and the expected communication cost from the processing resource to a cloud computing environment.

A second computing device located in a cloud management system retrieves resource mapping of applications currently executing in the cloud computing environment, models resource capacity from monitored historical values and task information from multiple applications, assigns the application-specific task to a specific computational resource in the cloud computing environment based on the expected computational cost and the expected communication cost and the resource availability of applications and based on the modeling resource capacity from monitored historical values and task information from multiple applications, determines a task to VM (virtual machine) assignment based on the assigning of the application-specific task to the specific computational resource, transfers the task to VM assignment from the cloud management system to the application executing on the processing resource in the cloud computing environment, and migrates VMs of existing applications onto different processing resources in the cloud computing environment based on assigning the application-specific task to the specific computational resource.

The first computing device redistributes data and the application-specific task of the application based on the transferring the task to VM assignment from the cloud management system to the application executing on the processing resource of the cloud computing environment.

According to one embodiment presented herein, a non-transitory computer storage medium readable by a computer tangibly embodying a program of instructions executable by the computer for a method of load balancing, the method comprising, in an application executing environment, calculating an expected cost set associated with an application-specific task of an application executing on a processing resource in a cloud computing environment, and communicating the expected cost set from the processing resource to the cloud computing environment.

The method further includes, in a cloud management system: retrieving resource mapping of applications currently executing in the cloud computing environment; assigning the application-specific task to a specific computational resource in the cloud computing environment based on the expected cost set and the resource mapping of applications currently executing in the cloud computing environment; determining a task to VM (virtual machine) assignment based on assigning the application-specific task to the specific computational resource; transferring the task to VM assignment from the cloud management system to the application executing on the processing resource in the cloud computing environment; and migrating VMs of existing applications onto different processing resources in the cloud computing environment based on assigning the application-specific task to the specific computational resource. Finally, the method redistributes, in the application executing environment, data and the application-specific task of the application based on the transferring the task to VM assignment from the cloud management system to the application executing on the processing resource of the cloud computing environment.

BRIEF DESCRIPTION OF THE SEVERAL VIEWS OF THE DRAWINGS

The embodiments of the invention will be better understood from the following detailed description with reference to the drawings, which are not necessarily drawn to scale and in which.

DETAILED DESCRIPTION

Current known solutions perform load balancing at two different levels, i.e., an application level and a cloud level, independently and hence are sub-optimal.

Effective optimization of the load assignment on the Cloud needs to take into account the High Performance Computing (HPC) application task requirements as well as the computational capacity and communication bandwidth of the Cloud resources. This disclosure proposes an approach for two-way transfer of the essential information between Cloud and HPC applications that result in better load assignment without violating network privacy.

Application Example

Adaptive Mesh Refinement (AMR)

Applications are generally modeled discretely using a mesh of vertices (signifying computation) and edges (signifying communication). Periodic rebalancing of the mesh has an objective of good load balancing, lower communication cost, lower migration cost, and shorter repartitioning time.

Generally AMR follows the following steps: 1.) An initial mesh is partitioned and distributed among processors; 2.) An application runs for several iterations, while updating local error estimates, based on which mesh refinement module does a logical AMR; 3.) The outcome from the logical AMR indicates a new computational and communication load (assuming a homogenous system), based on which load balancing decision is made; and 4.) The mesh repartition, migration, and optional mesh smoothing (physical AMR) is carried out, wherein the new mesh is created by refining a subset of elements from the coarse mesh.

Optimal load assignment, i.e., assignment of tasks to resources, is critical to ensure optimal performance for HPC applications.

The cloud has ready access to historical information on computational capacity and communication bandwidth of individual resources/nodes, but the cloud is typically constrained because it cannot share this historical information due to security or business related reasons. Also, applications do not have information on the dynamic, non-uniform computational capacity and communication bandwidth of cloud resources. Additionally, there is a lack of information exchange concerning competing applications.

One embodiment presented herein integrates both the cloud and application level load balancing. Effective optimization of the load assignment needs to take into account both the HPC application task requirements as well as the computational capacity and communication bandwidth of the cloud resources. Thus, there needs to be an intelligent exchange of information between the cloud and the applications, and load balancing needs to be performed by the cloud management system using this information.

One embodiment enables a two-way transfer of essential information between cloud and HPC applications that results in better load assignment without violating network privacy. HPC applications provide the task specific computational and communication requirements to the cloud, while the cloud determines the optimal load assignment (by performing simultaneously load balancing across applications and task placement based on an application provided task graph). The mapping [task to VM (virtual machine) assignment] is then communicated back to the application, which then implements it.

The cloud periodically monitors and measures computational capacity and communication bandwidth of the network resources and learns a statistical model for these quantities using historical data, typically giving more weight to the most recent measurements.

HPC applications involve multiple steps or iterations, e.g., those involving adaptive mesh refinement (AMR). In each iteration, the following steps are performed:

1. The application estimates the computational and communication costs of the constituent tasks using a combination of theoretical models and historical application-specific information, (e.g., from previous iterations).

2. The application constructs a directed task graph where the vertices correspond to tasks, edges correspond to task dependencies, vertex weights correspond to the computation costs, and the edge weights correspond to the communication costs.

3. In the case of large task graphs, applications may perform an initial partitioning and coarsening of the task graph to obtain a smaller coarsened task graph.

4. The application passes the final task graph to the cloud management system.

5. The cloud management system uses both the application task graph as well as the network resource information to identify the optimal load assignment, (i.e., the task to resource assignment/mapping), via sophisticated graph partitioning algorithms.

6. The cloud management system can migrate virtual machines (VMs) of the applications as determined by the partitioning algorithm above.

7. The cloud management system passes the load assignment/mapping to the application.

8. The application then redistributes data and tasks among the VMs according to the specified load assignment/mapping.

Another integrated load balancing embodiment includes input including: 1) an application task graph $G_A$; 2) coarse task graph for VMs running on cloud $G_V$; 3) current state of cloud resources C; 4) current mapping $\rho_V$ of VMs in $G_V$ to the processing resources of the cloud computing environment.

Output may include a new mapping $\rho$ of tasks in $G_A$ to VMs and currently running VMs to the processing resources of the cloud computing environment that minimize computation, communication, and/or migration costs.

The details of this embodiment include:

1. Creating a new task graph $G_1$ that is the union of $G_A$ and $G_V$;

2. For r=1 to (R−1) iterations, coarsen the graph $G_r$ to $G_{r+1}$ by collapsing task vertices, (except those in $G_V$), using heuristics such as heavy edge matching to minimize communication volume;

3. Partition $G_R$ such that the computational load is balanced, (within the range of a threshold), according to the capacity of the resources without any migration of VMs in $G_V$;

4. For r=R to 1, do:
   a.) Greedily refine the current partitioning of $G_r$ by re-assigning tasks among resources based on communication and VM migration costs subject to load balancing constraints; and
   b.) If (r>1), un-coarsen the graph $G_r$ to the next finer level $G_{r-1}$ and induce a partitioning on $G_{r-1}$.

5. Use the partitioning of $G_1$ to obtain the new mapping of currently running VMs in $G_V$ and tasks in $G_A$ grouped as VMs to the processing resources of the cloud computing environment.

Figure 1:
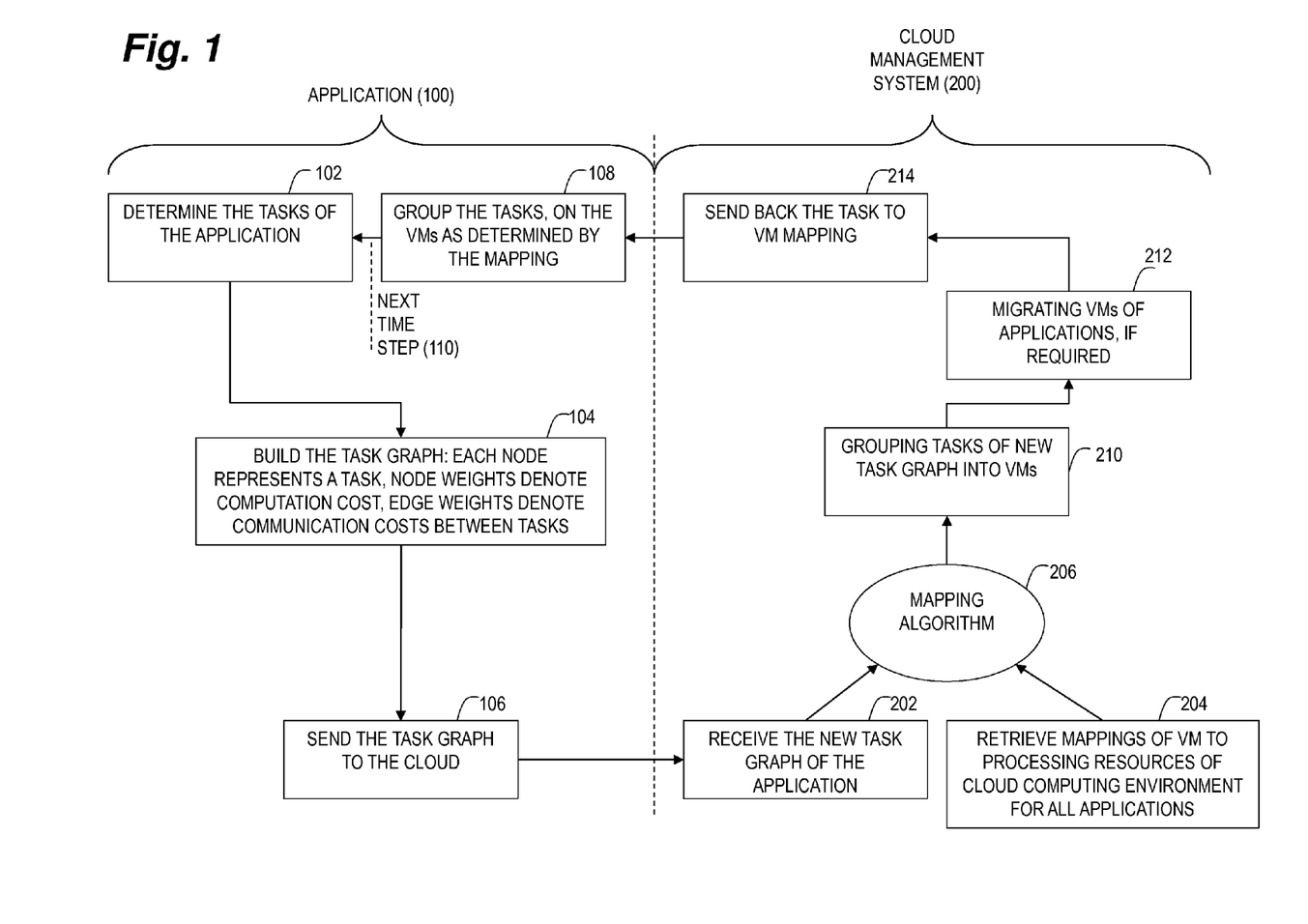
FIG. 1 is a schematic diagram of a disclosed embodiment herein.

FIG. 1 is a schematic diagram of a disclosed embodiment illustrating an application side 100 that includes the processes of determining the tasks of an application 102 and building a task graph 104. The task graph 104 represents each node as a task, each node weight as a computation cost, and edge weights between nodes represent communication costs between tasks. After the task graph is constructed, the task graph is sent to the cloud 106.

A cloud management system side 200 receives this new task graph of the application 202 and retrieves mapping of VMs to the processing resources of the cloud computing environment for all applications 204. These are then sent to a mapping algorithm 206. Tasks of the current application may be grouped into Virtual Machines (VM) 210, and VMs of specific applications may be migrated onto different resources 212.

Thereafter, the task to VM mapping is sent back 214 to the application side 100, where tasks are grouped on the VMs as determined by the mapping 108. Thereafter, the process may iteratively repeat itself 110.)

The novelty of this approach is a two-way transfer of the essential information between cloud management system 200 and the HPC application environment 100 that results in better load assignment without violating network privacy. HPC applications (at 100) provide the task specific computational and communication requirements to the cloud (at 200), where the cloud management system determines the optimal load assignment (the cloud management system performs load balancing across applications and task placement based on an application provided task graph, simultaneously), and communicates this task allocation (at 214) back to the application 100, which then implements it to run efficiently on the processing resources of the cloud computing environment.

Figure 2:
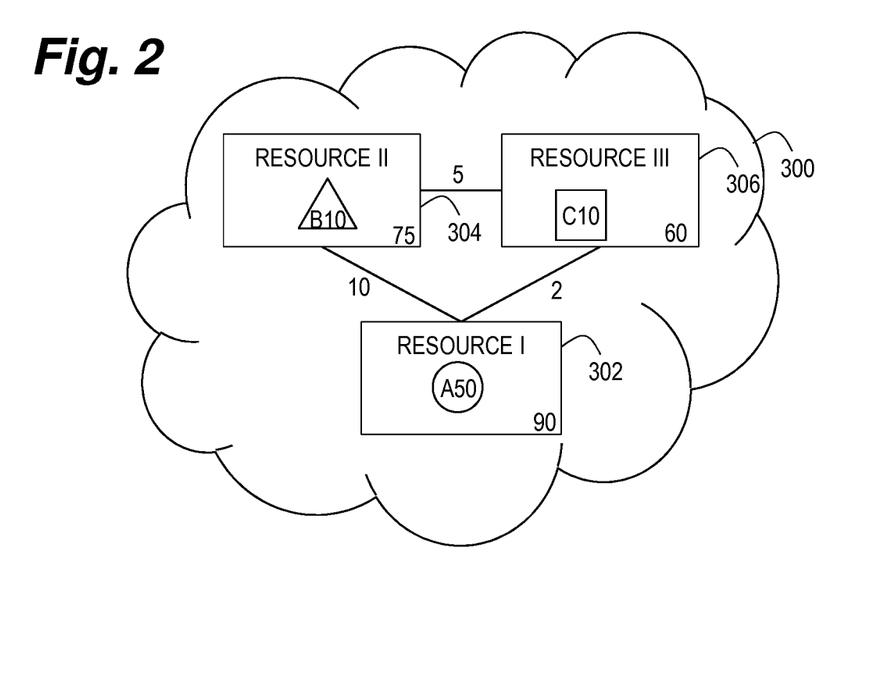
FIG. 2 is a schematic diagram of a disclosed embodiment herein.

FIG. 2 illustrates a schematic diagram of a disclosed embodiment that represents an initial cloud configuration 300 including three resources, (RESOURCE I 302, RESOURCE II 304, RESOURCE III 306), within the cloud 300 shown by rectangular boxes. Each of the resources are globally separated from each other resource and have individual computational capacity values: RESOURCE I having a computational capacity of 90 units, RESOURCE II having a computational capacity of 75 units, and RESOURCE III having a computational capacity of 60 units. These computational units are representative values that demonstrate a relative computational capacity between the different resources.

Communication between the resources is represented by lines connecting each of the resource nodes. RESOURCE I 302 is in communication with RESOURCE II 304 and RESOURCE III 306, and RESOURCE II 304 and RESOURCE III 306 are in communication with each other. Communication capacity values are represented by numerical values associated with each communication line between the resource nodes. The communication bandwidth between RESOURCE I 302 and RESOURCE II 304 is 10 units; between RESOURCE I 302 and RESOURCE III 306 is 2 units and between RESOURCE II 304 and RESOURCE III 306 is 5 units. These communication bandwidth units are representative values that demonstrate a relative communication bandwidth capacity between the different resources.

In the initial cloud configuration 300, there are already three Virtual Machines (VMs) running on the resources. RESOURCE I 302 runs a VM task A50 having computational unit requirement of 50 (leaving RESOURCE I with the capacity to run another VM with computational requirement up to (90−50)=40 units); RESOURCE II 304 runs a VM task B10 with a computational requirement of 10 units (leaving RESOURCE II with a computational capacity of (75−10)=65 units); and RESOURCE III runs a VM task C10 with a computational requirement of 10 units (leaving RESOURCE III with a computational capacity of (60−10)=50 units).

Figure 3:
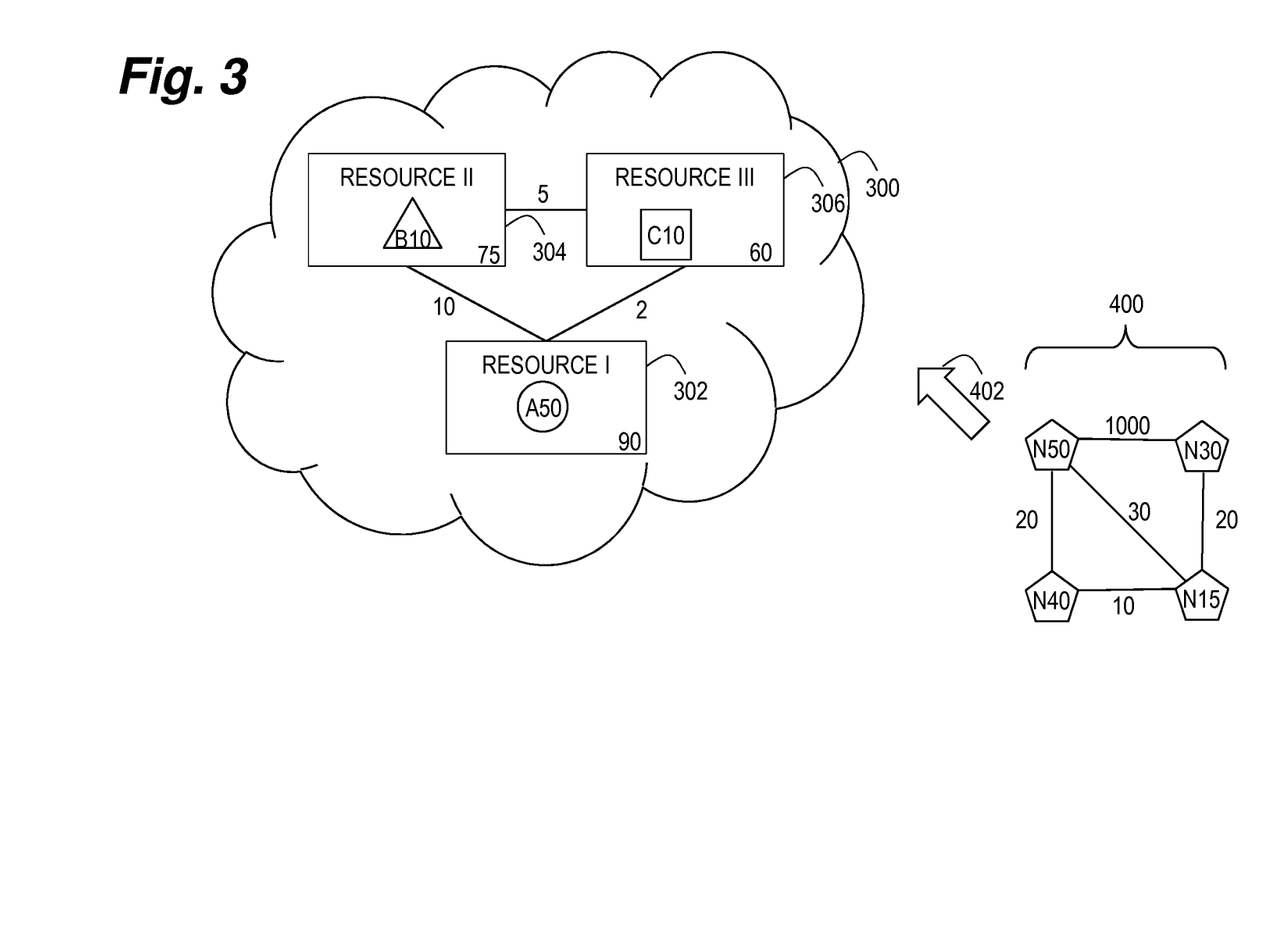
FIG. 3 is a schematic diagram of a disclosed embodiment herein.

FIG. 3 illustrates a schematic diagram of a disclosed embodiment where a new task graph application 400 arrives to be applied to the computing VM resource nodes 302, 304 and 308 of the initial cloud configuration 300. This new task graph application 400 has a group of tasks N50, N30, N40 and N15 that needs to be grouped into the existing VMs of cloud configuration 300. A request 402 from the new task graph 400 is made to the cloud 300 that requests a specific number of VMs; in this instance the new task graph 400 requests 3 VMs to handle the new tasks N50, N30, N40 and N15.

The computational requirements of the four new tasks, (shown as the pentagon-shaped nodes of the graph), N50, N30, N40, and N15 are 50, 30, 40, and 15 units, respectively. Since the tasks need to communicate among themselves, communication requirements are represented by lines between the tasks, as illustrated. The communication cost between task N50 and N40 is 20 units; between N50 and N15 is 30 units; between N50 and N30 is 1000 units; between N40 and N15 is 10 units; and between N30 and N15 is 20 units. Higher communication costs between tasks implies that those tasks be grouped in the same VM to eliminate node to node communication costs. For example, it would be advisable to group task N50 and task N30 in the same VM since they have a large communication cost of 1000 units; while task N40 and N30 may be placed in different VMs since they do not require any direct communication between each other.

The new task graph application 400 sends this task graph information 402 to the cloud 300.

Figure 4:
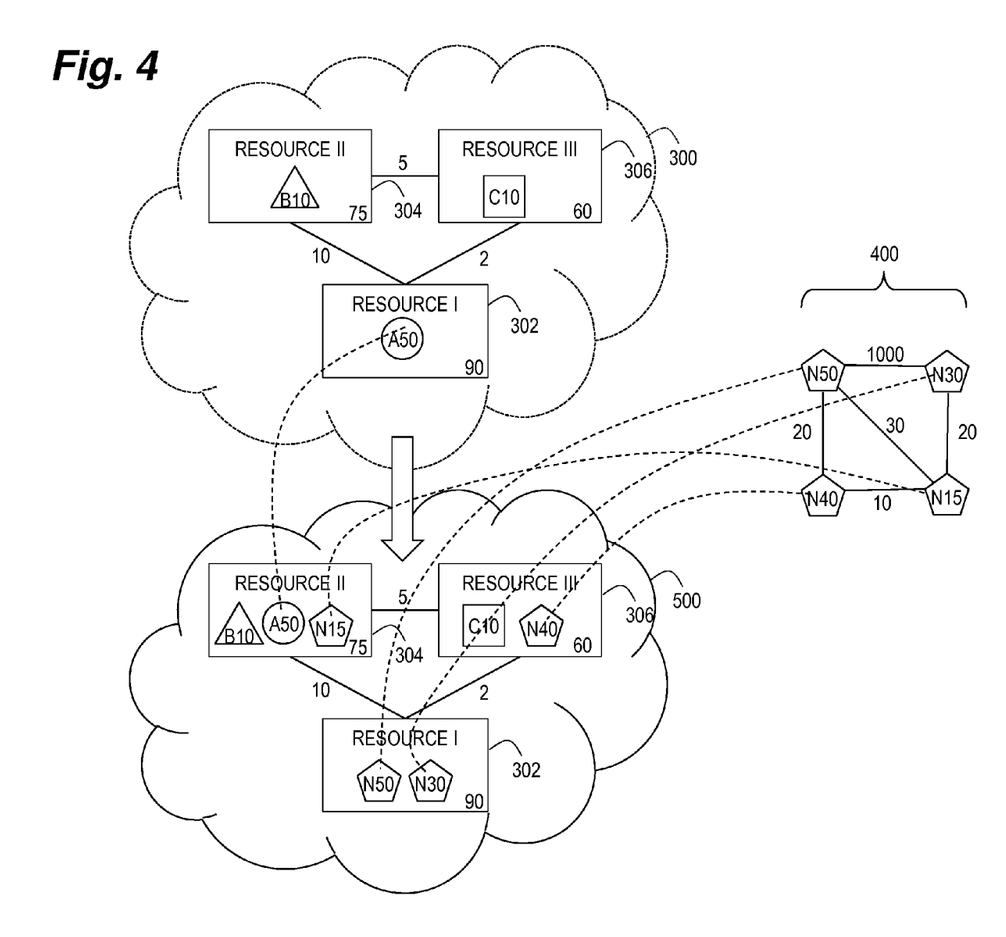
FIG. 4 is a schematic diagram of a disclosed embodiment herein.

FIG. 4 illustrates a schematic diagram of a disclosed embodiment where the cloud 300 needs to group the tasks into the three VMs shown in the initial configuration. A new cloud configuration 500 is illustrated showing the appropriation and reassignment of the existing and new tasks to the computational resource node VMs (RESOURCES I, II, III).

RESOURCE I 302 can accommodate a VM up to (90−50) =40 units; RESOURCE II 304 can accommodate a VM up to (75−10)=65 units; RESOURCE III 306 can accommodate a VM up to (60−10)=50 units. Thus, there is a need to migrate some initial tasks between the existing VMs. Of the three resources, only RESOURCE I 302 has capacity more than 80.

Thus the embodiments herein migrate VM task A50 from RESOURCE I 302 to RESOURCE II 304 (which still has sufficient room in RESOURCE II 304 to run task B10 and new task N15 of the new application and provides sufficient room in RESOURCE I 302 to run task N50 and N30). Additionally, since the communication bandwidth between RESOURCE I 302 and RESOURCE II 304 is a large value of 10, it is less costly to migrate the VM task A50 from RESOURCE I 302 to RESOURCE II 304. Thus, RESOURCE I 302 now runs task N50 and task N30 of the new application graph.

RESOURCE II 304 runs the already existing VM tasks A50 and B10 having computational requirements 50 and 10 units, respectively. Since it can accommodate another VM of capacity up to (75−50−10)=15 units, the embodiments herein assign task N15 of the new application graph 400 on this resource. The remaining new task N40 is assigned to RESOURCE III 306, which now runs the already existing VM task C10 having a computational requirement of 10 units and the new task N40 having a computational requirement of 40 units.

RESOURCE II 304 runs the already existing VMs A50 and B10 having computational requirements 50 and 10 units, respectively. Since it can accommodate another VM of capacity up to (75−50−10)=15 units, the embodiments herein assign task N15 of the new application graph 400 on this resource. The remaining new task N40, is assigned to RESOURCE III 306, which now runs the already existing VM C10 having a computational requirement of 10 units and the new task N40 having a computational requirement of 40 units.

Figure 5:
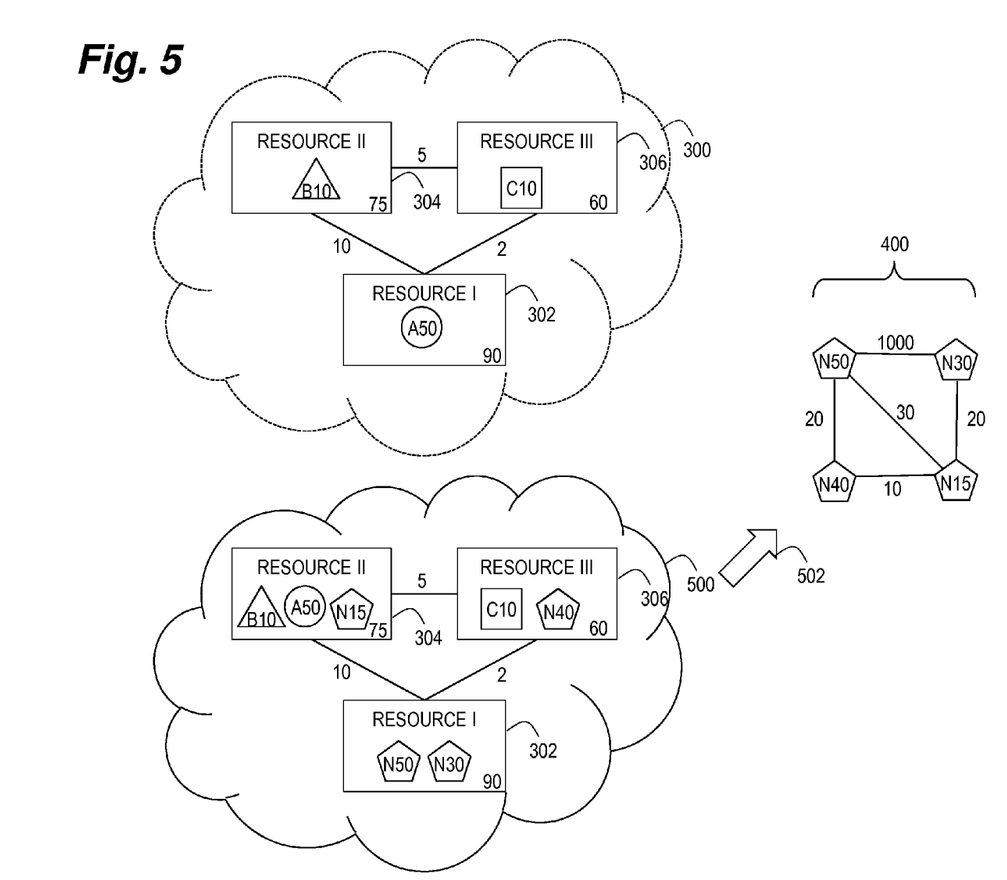
FIG. 5 is a schematic diagram of a disclosed embodiment herein.

FIG. 5 illustrates a schematic diagram of a disclosed embodiment that sends task to VM mapping data from the cloud back to the application. The VM mapping data, for example, includes "(1,1,2,3)" that represents new task N50 is mapped to RESOURCE I 302 ("1"), new task N30 is mapped to RESOURCE I 302 ("1"), new task N15 is mapped to RESOURCE II 304 ("2"), and new task N40 is mapped to RESOURCE III 306 ("3").

Figure 6:
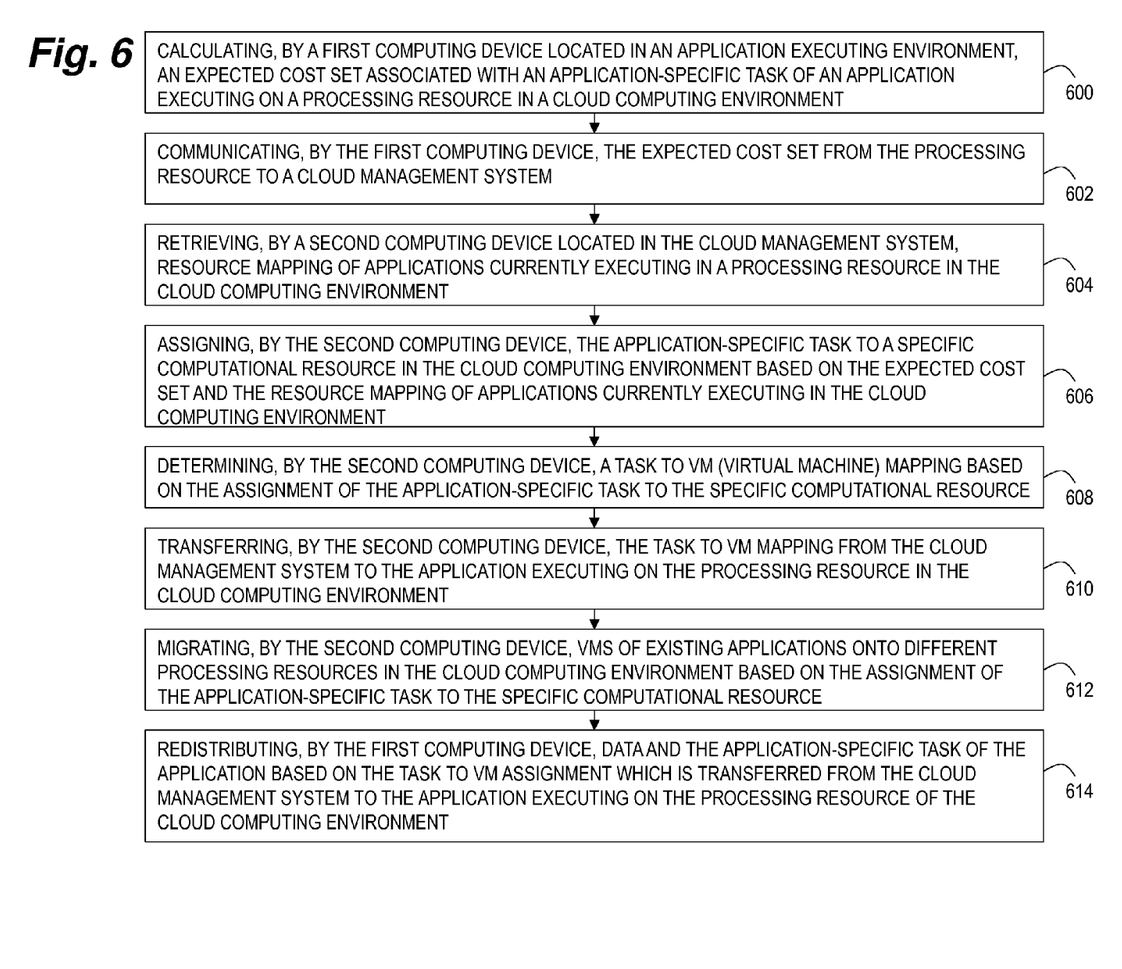
FIG. 6 is a logic flow chart of a disclosed embodiment herein.

FIG. 6 illustrates a logical flowchart of one embodiment including a computer-implemented method of load balancing that calculates by a first computing device located in an application executing environment, an expected cost set associated with an application-specific task of an application executing on a processing resource in a cloud computing environment 600. The first computing device communicates the expected cost set from the processing resource to the cloud management system 602. A second computing device located in a cloud management system retrieves resource mapping of applications currently executing in the cloud computing environment 604. The second computing device assigns the application-specific task to a specific computational resource in the cloud computing environment based on the expected cost set and the resource mapping of applications currently executing in the cloud computing environment 606. The second computing device determines a task to VM (virtual machine) mapping based on the assignment of the application-specific task to the specific computational resource 608. The second computing device transfers the task to VM assignment from the cloud management system to the application executing on the processing resources of the cloud computing environment 610. The second computing device migrates VMs of existing applications onto different processing resources in the cloud computing environment based on the assignment of the application-specific task to the specific computational resource 612. The first computing device redistributes data and the application-specific task of the application based on the task to VM assignment which is transferred from the cloud management system to the application executing on the processing resource of the cloud computing environment 614.

Figure 7:
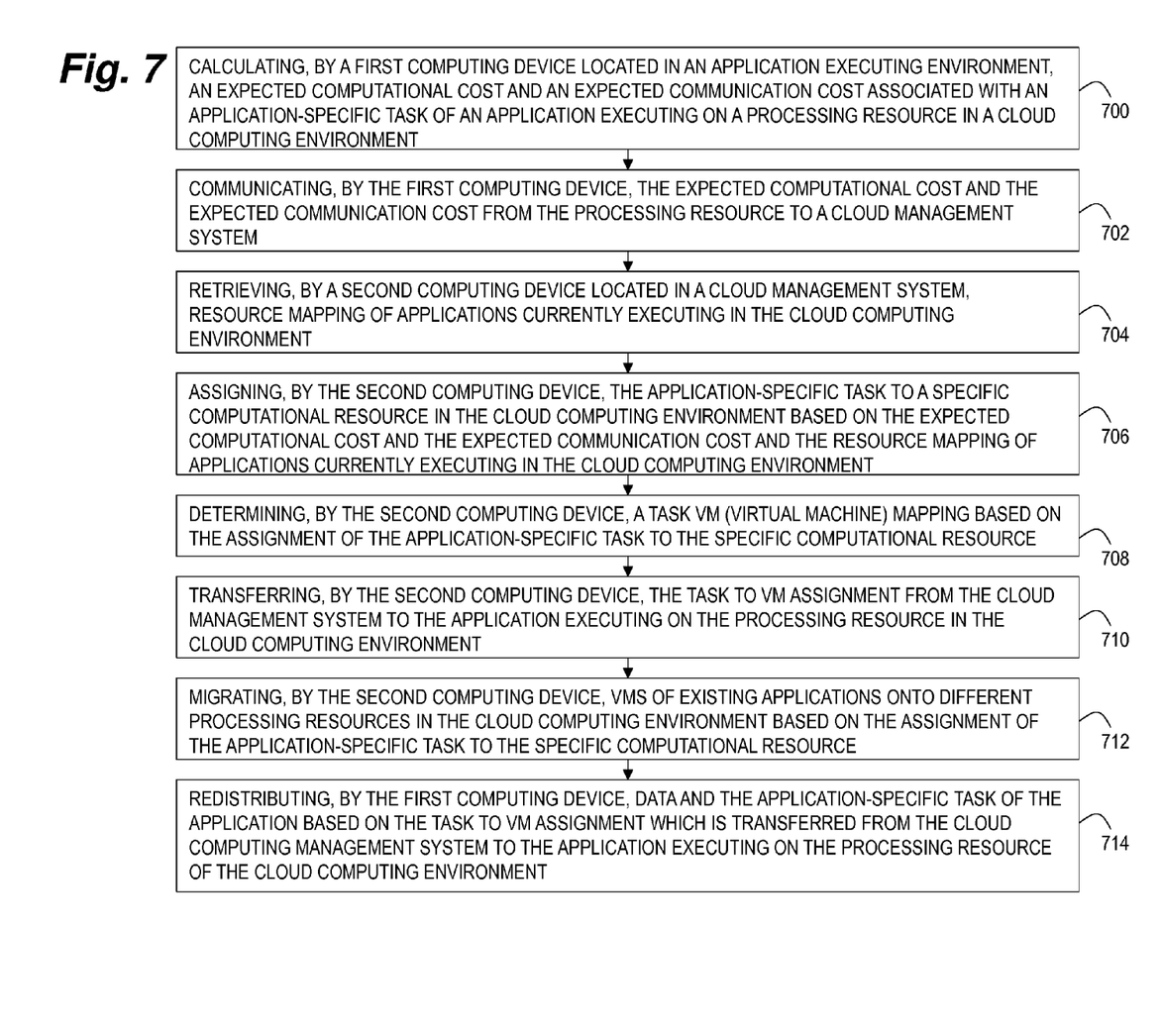
FIG. 7 is a logic flow chart of a disclosed embodiment herein.

FIG. 7 illustrates a logical flowchart of one embodiment including a method of load balancing that calculates by a first computing device located in an application executing environment, an expected computational cost and an expected communication cost associated with an application-specific task of an application executing on a processing resource in a cloud computing environment 700. The first computing device communicates the expected computational cost and the expected communication cost from the processing resource to a cloud management system 702. A second computing device located in a cloud management system retrieves resource mapping of applications currently executing in the cloud computing environment 704. The second computing device assigns the application-specific task to a specific computational resource in the cloud computing environment based on the expected computational cost and the expected communication cost and the resource mapping of applications currently executing in the cloud computing environment 706. The second computing device determines a task to VM (virtual machine) mapping based on the assignment of the application-specific task to the specific computational resource 708. The second computing device transfers the task to VM assignment from the cloud management system to the application executing on the processing resources of the cloud computing environment 710. The second computing device migrates VMs of existing applications onto different processing resources in the cloud computing environment based on the assignment of the application-specific task to the specific computational resource 712. The first computing device redistributes data and the application-specific task of the application based on the task to VM assignment which is transferred from the cloud management system to the application executing on the processing resource of the cloud computing environment 714.

Figure 8:
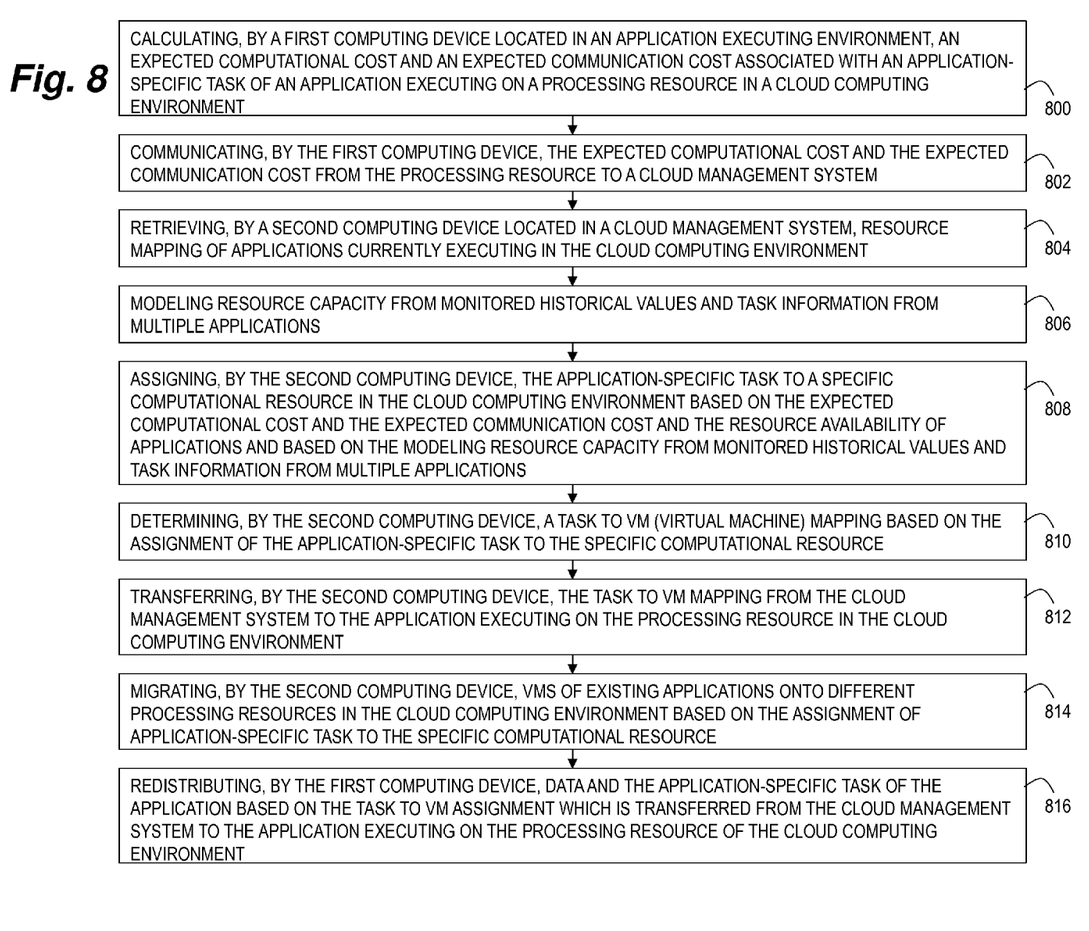
FIG. 8 is a logic flow chart of a disclosed embodiment herein.

FIG. 8 illustrates a logical flowchart of one embodiment including a method of load balancing that calculates, by a first computing device located in an application executing environment, an expected computational cost and an expected communication cost associated with an application-specific task of an application executing on a processing resource in a cloud computing environment 800. The first computing device communicates the expected computational cost and the expected communication cost from the processing resource to a cloud management system 802. A second computing device located in a cloud management system retrieves resource mapping of applications currently executing in the cloud computing environment 804. Resource capacity is modeled from monitored historical values and task information from multiple applications 806. The second computing device assigns the application-specific task to a specific computational resource in the cloud computing environment based on the expected computational cost and the expected communication cost and the resource availability of applications and based on the modeling resource capacity from monitored historical values and task information from multiple applications 808. The second computing device determines a task to VM (virtual machine) assignment based on the assignment of the application-specific task to the specific computational resource 810. The second computing device transfers the task to VM assignment from the cloud management system to the application executing on the processing resources of the cloud computing environment 812. The second computing device migrates VMs of existing applications onto different processing resources in the cloud computing environment based on the assignment of the application-specific task to the specific computational resource 814. The first computing device redistributes data and the application-specific task of the application based on the task to VM assignment which is transferred from the cloud management system to the application executing on the processing resource of the cloud computing environment 816.

As will be appreciated by one skilled in the art, aspects of the embodiments herein may be embodied as a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in at least one computer readable medium(s) having computer readable program code embodied thereon.

Any combination of at least one computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
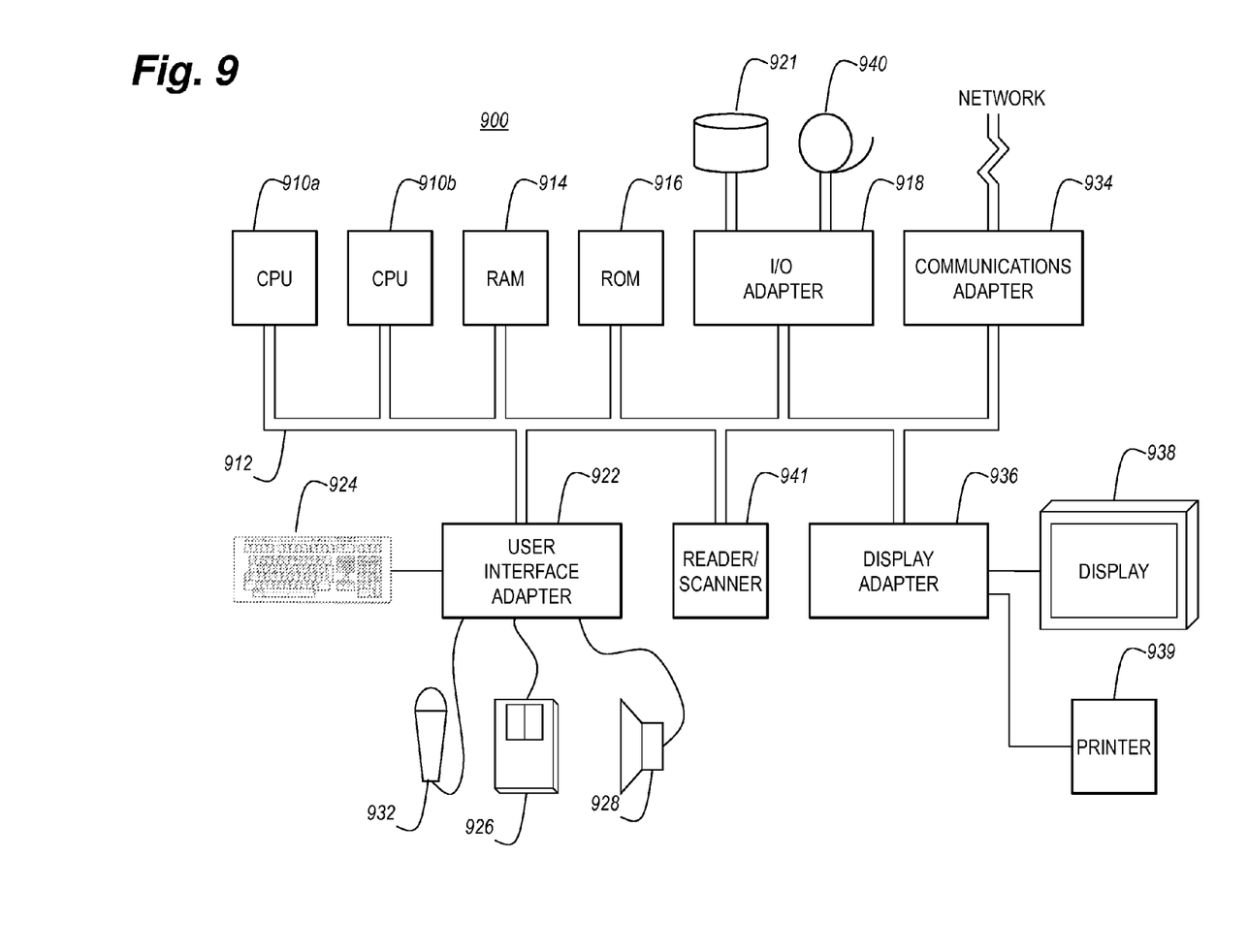
FIG. 9 is a schematic diagram of a disclosed embodiment herein.

Referring now to FIG. 9, system 900 illustrates a typical hardware configuration which may be used for implementing the inventive system and method for load balancing a distributed computing system. The configuration has preferably at least one processor or central processing unit (CPU) 910a, 910b. The CPUs 910a, 910b are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, and Intranet, a personal area network (PAN), etc., and a display adapter 936 for connecting the bus 912 to a display device 938 and/or printer 939. Further, an automated reader/scanner 941 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the embodiments herein are directed to a programmed product, including signal-bearing media tangibly embodying a program of machine-readable instructions executable by a digital data processor to perform the above method.

Such a method may be implemented, for example, by operating the CPU 910 to execute a sequence of machine-readable instructions. These instructions may reside in various types of signal bearing media.

Thus, this aspect of the embodiments herein are directed to a programmed product, comprising signal-bearing media tangibly embodying a program of machine-readable instructions executable by a digital data processor incorporating the CPU 910 and hardware above, to perform the method of the invention.

Whether contained in the computer server/CPU 910, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment herein, the machine-readable instructions may comprise software object code, complied from a language such as "C," etc.

The terminology used herein is for the purpose of describing particular embodiments only and is not intended to be limiting of the embodiments herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of at least one other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments herein have been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of load balancing processing resources, said method comprising:
    calculating, by a first computing device located in an application executing environment, an expected cost set associated with an application-specific task of an application executing on a processing resource in a cloud computing environment, said first computing device being outside said cloud computing environment, said expected cost set comprising an expected computational cost and an expected communication cost;
    communicating, by said first computing device, said expected cost set from said first computing device to a second computing device located in a cloud management system;
    retrieving, by said second computing device, resource mapping of applications currently executing in said cloud computing environment;
    assigning, by said second computing device, said application-specific task to a specific computational resource in said cloud computing environment based on said expected cost set and said resource mapping of applications currently executing in said cloud computing environment;
    determining, by said second computing device, a task to VM (virtual machine) assignment based on said assigning said application-specific task to said specific computational resource in said cloud computing environment;
    transferring, by said second computing device, information concerning said task to VM assignment from said cloud management system to said application executing on said processing resource in said cloud computing environment;
    migrating, by said second computing device, VMs of existing applications onto different processing resources in said cloud computing environment based on said assigning said application-specific task to said specific computational resource in said cloud computing environment; and
    redistributing, by said first computing device, data and said application-specific task of said application based on said transferring said information concerning said task to VM assignment from said cloud management system to said application executing on said processing resource of said cloud computing environment.

2. The computer-implemented method of load balancing according to claim 1, said expected cost set associated with said application-specific task being represented in a directed task graph form.

3. The computer-implemented method of load balancing according to claim 2, said directed task graph form comprising:
    vertices that correspond to a task;
    edges that correspond to a task dependency;
    vertex weights that correspond to said expected computational cost; and
    edge weights that correspond to said expected communication cost.

4. The computer-implemented method of load balancing according to claim 2, said directed task graph form being generated by an application-specific coarsening of an original problem domain.

5. The computer-implemented method of load balancing according to claim 1, said method of load balancing being performed a plurality of times in an iterative fashion.

6. A computer-implemented method of load balancing processing resources, said method comprising:
    calculating, by a first computing device located in an application executing environment, an expected computational cost and an expected communication cost associated with an application-specific task of an application executing on a processing resource in a cloud computing environment, said first computing device being outside said cloud computing environment;
    communicating, by said first computing device, said expected computational cost and said expected communication cost from said processing resource to a second computing device located in a cloud management system;
    retrieving, by said second computing device, resource mapping of applications currently executing in said cloud computing environment;
    assigning, by said second computing device, said application-specific task to a specific computational resource in said cloud computing environment based on said expected computational cost, said expected communication cost, and said resource mapping of said applications currently executing in said cloud computing environment;
    determining, by said second computing device, a task to VM (virtual machine) assignment based on said assigning of said application-specific task to said specific computational resource;
    transferring, by said second computing device, said task to VM assignment from said cloud management system to said application executing on said processing resource in said cloud computing environment;
    migrating, by said second computing device, VMs of existing applications onto different processing resources in said cloud computing environment based on said assigning said application-specific task to said specific computational resource; and
    redistributing, by said first computing device, data and said application-specific task of said application based on said transferring said task to VM assignment from said cloud management system to said application executing on said processing resource of said cloud computing environment.

7. The computer-implemented method of load balancing according to claim 6, said expected computational cost and said expected communication cost associated with said application-specific task being represented in a directed task graph form.

8. The computer-implemented method of load balancing according to claim 7, said directed task graph form comprising:
    vertices that correspond to a task;
    edges that correspond to a task dependency;
    vertex weights that correspond to said expected computational cost; and
    edge weights that correspond to said expected communication cost.

9. The computer-implemented method of load balancing according to claim 7, said directed task graph form being generated by an application-specific coarsening of an original problem domain.

10. The computer-implemented method of load balancing according to claim 6, said method of load balancing being performed a plurality of times in an iterative fashion.

11. The computer-implemented method of load balancing according to claim 6, said assigning said application-specific task to said specific computational resource in said cloud computing environment being further based on modeling resource capacity from monitored historical values.

12. The computer-implemented method of load balancing according to claim 6, said assigning said application-specific task to said specific computational resource in said cloud computing environment being further based on task information from multiple applications.

13. A computer-implemented method of load balancing processing resources, said method comprising:
- calculating, by a first computing device located in an application executing environment, an expected computational cost and an expected communication cost associated with an application-specific task of an application executing on a processing resource in a cloud computing environment, said first computing device being outside said cloud computing environment;
- communicating, by said first computing device, said expected computational cost and said expected communication cost from said processing resource to a second computing device located in a cloud management system;
- retrieving, by said second computing device, resource mapping of applications currently executing in said cloud computing environment;
- modeling resource capacity from monitored historical values and task information from multiple applications;
- assigning, by said second computing device, said application-specific task to a specific computational resource in said cloud computing environment based on said expected computational cost, said expected communication cost, and resource availability for applications currently executing in said cloud computing environment and based on said modeling said resource capacity from monitored historical values and task information from multiple applications;
- determining, by said second computing device, a task to VM (virtual machine) assignment based on said assigning of said application-specific task to said specific computational resource;
- transferring, by said second computing device, said task to VM assignment from said cloud management system to said application executing on said processing resource in said cloud computing environment;
- migrating, by said second computing device, VMs of existing applications onto different processing resources in said cloud computing environment based on said assigning said application-specific task to said specific computational resource; and
- redistributing, by said first computing device, data and said application-specific task of said application based on said transferring said task to VM assignment from said cloud management system to said application executing on said processing resource of said cloud computing environment.

14. The computer-implemented method of load balancing according to claim 13, said expected computational cost and said expected communication cost associated with said application-specific task being represented in a directed task graph form.

15. The computer-implemented method of load balancing according to claim 14, said directed task graph form comprising:
- vertices that correspond to a task;
- edges that correspond to a task dependency;
- vertex weights that correspond to said expected computational cost; and
- edge weights that correspond to said expected communication cost.

16. The computer-implemented method of load balancing according to claim 14, said directed task graph form being generated by an application-specific coarsening of an original problem domain.

17. The computer-implemented method of load balancing according to claim 13, said method of load balancing being performed a plurality of times in an iterative fashion.

* * * * *